May 24, 1949.  J. BOLTEN, JR  2,471,258
MOLD FOR SLIDING CLASP FASTENERS
Filed July 25, 1946  2 Sheets-Sheet 1

Inventor:
John Bolten, Jr.
by Heard Smith & Tennant
Attorneys

May 24, 1949.  J. BOLTEN, JR  2,471,258
MOLD FOR SLIDING CLASP FASTENERS
Filed July 25, 1946  2 Sheets-Sheet 2

Inventor:
John Bolten Jr.
By Heard Smith & Tennant
Attorneys

Patented May 24, 1949

2,471,258

UNITED STATES PATENT OFFICE 2,471,258

MOLD FOR SLIDING CLASP FASTENERS

John Bolten, Jr., Andover, Mass., assignor to The Bolta Company, Lawrence, Mass., a corporation of Massachusetts Application July 25, 1946, Serial No. 686,232

5 Claims. (Cl. 18—42)

This invention relates to apparatus for moulding upon the respective stringers of a sliding clasp fastener all of the cooperating elements of the respective stringers.

One of the objects of the invention is to provide apparatus for simultaneously moulding the cooperating elements on the respective stringers in such manner that after the insertion of the respective stringers with the interlocking elements moulded thereon through the channels of the slider the lower ends of the stringers can be readily assembled to produce a complete and operative sliding clasp fastener.

Another object of the invention is to provide a moulding apparatus of the character described which will insure accurate positioning of all the cooperating elements when the stringers and sliders are assembled in operative relation thereby to avoid improper positioning or spacing of the elements which is likely to occur when they are individually attached to the stringers as in usual constructions.

In usual sliding clasp fasteners having a separable bottom stop comprising a box-like retainer provided with an aperture to receive a pin on the end of the other stringer, the aperture in the retainer is ordinarily provided with a closed lower end. Such retainers are necessarily separately moulded for the reason that if the retainer were moulded upon the stringer simultaneously with the moulding of the interlocking elements thereon the mould could not be provided with a suitable removable core to form the recess for the cooperating pin of the other stringer.

Another object of the invention is to provide a moulding apparatus for moulding the apertured bottom stop retainer on one of the stringers simultaneously with the moulding of the interlocking elements thereon.

A further object of the invention is to provide an apparatus for moulding upon one of the stringers the bottom stop retainer having a downwardly diverging aperture therethrough to receive the pin on the other stringer so formed as to permit the escape of such debris as may have accumulated in said aperture as described in my prior application for patent upon Separable bottom stop mechanisms for sliding clasp fasteners, Serial Number 629,249, filed November 17, 1945, of which this application is a continuation in part.

A further object of the invention is to provide a moulding apparatus having complementary mould sections with means for receiving the respective stringers and cavities for moulding the interlocking elements, a finger, and bottom stop retainer upon the respective elements and having a tapered core extending across the cavity of the bottom stop retainer, and means for inserting the core into the cavity or removing it therefrom while the mould sections are in closed position.

Another object of the invention is to provide a mould of the character above described having means for introducing mouldable material under suitable pressure simultaneously into all of the cavities of the mould, whereby all of the moulded elements will be simultaneously affixed and effectively secured upon the stringers.

These and other objects and features of the invention will more fully appear from the following description and the accompanying drawings and will be particularly pointed out in the claims.

A preferred embodiment of the invention is illustrated in the accompanying drawings, in which, Fig. 1 is an underneath plan view of the upper removable mould section showing the cavities for moulding upon the respective stringers, suitably spaced interlocking elements and the cooperating retainer and pin;

Fig. 2 is a plan view of the lower mould section showing grooves for the respective stringers, suitably spaced cavities for the interlocking elements, cavities for the retainer and pin cooperating therewith, and in full lines the core for the pin aperture in the retainer extending across the retainer cavity and the mechanism for inserting and removing the core, and in dotted lines the position of the mechanism for actuating the core in withdrawn position;

Figure 1:
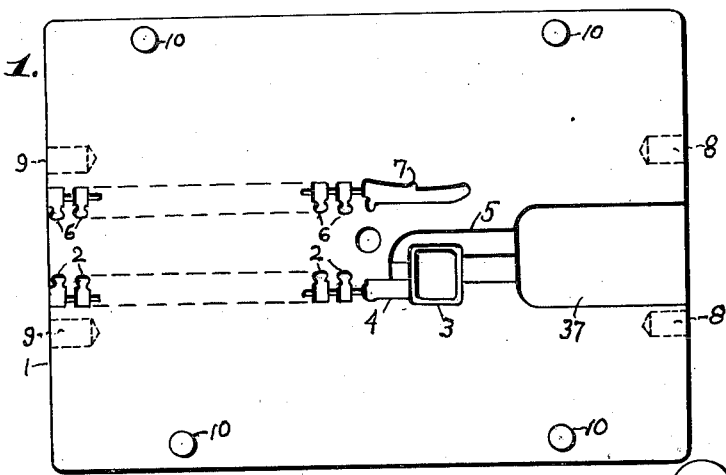

The moulding apparatus particularly illustrated herein is for simultaneously moulding upon both stringers of a sliding clasp fastener the interlocking elements and the cooperating retainer and pins for sliding clasp fasteners of the type disclosed in my prior application Serial Number 629,249 above noted. The mould as illustrated in the accompanying drawings comprises an upper mould section 1 having a plain flat face provided with a series of cavities 2 for the interlocking elements of one of the stringers, the cavity 3 for the retainer and the cavity for the finger 4 extending therefrom, the channel 5 for the core of the retainer, and also showing associated therewith and spaced therefrom cavities 6 for the complementary interlocking elements of the other stringer, and the cavity 7 for the pin which is moulded upon the stringer. The upper mould section is provided preferably at its ends with suitable sockets 8 and 9 to receive means for raising and lowering the upper mould section and with usual dowel pins 10 adapted to seat in complementary dowel sockets in the lower mould section.

The lower mould section 11 has a flat surface 12 and relatively narrow flat surfaces 13 and 14 extending from the surface 12 and flush therewith adapted to be engaged by the flat under surface of the upper mould section 1 and is provided with suitable dowel-receiving holes 15 complementary to the dowels 10 of the upper mould section. Preferably the ends of the lower mould section are provided with sockets 16 and 17 to receive anchoring members for securing the lower mould section to a suitable base. The lower mould section is provided with parallel longitudinal channels or grooves 18 and 19 of suitable width to receive the respective stringers 20 and 21 with the beaded edges of the respective stringers extending into cavities 22 and 23 of the respective interlocking elements complementary to the cavities 2 and 6 of the upper mould half and cavities 24 and 25 complementary to the cavities 3 and 4 of the upper mould section and the cavity 26 complementary to the pin cavity 7 of the upper mould section.

The lower mould section is provided intermediate of the cavities 22 and 23 in the lower mould section with a longitudinal channel 27 forming a runner for the flowing mouldable material and provided respectively with gates 28 and 29 leading to the mould cavities 22 and 23 respectively. Other gates 30 and 31 lead respectively to the cavities for the retainer and cooperating pin. A preferably diverging sprue hole 32 in the upper mould section extends downwardly from a block 33 countersunk in the upper surface of the upper die 1 and provided with a downwardly converging inlet 34 communicates with the runner channel in proximity to the gates 30 and 31 which lead respectively to the retainer and pin.

As previously described one of the objects of the invention is to provide means for casting the runner with an aperture for a pin therethrough directly upon its stringer. In the construction illustrated herein a core 35 of metal or suitable rigid material is slidably mounted in the channel 5 of the upper mould section and a complementary channel in the lower mould section and is integral with or fixedly secured to a generally rectangular head 36 which slidably fits in a channel 37 in the upper mould section and a complementary channel in the lower mould section. The head 36 of the core 35 has secured to it a preferably relatively narrow bifurcated extension 38 which is connected by a pin 39 to a lever 40 which is fulcrumed upon a stud 41 in the preferably bifurcated end of a bracket 42 of an extension 43 which is fixedly secured in the end of the lower mould section.

Figure 2:
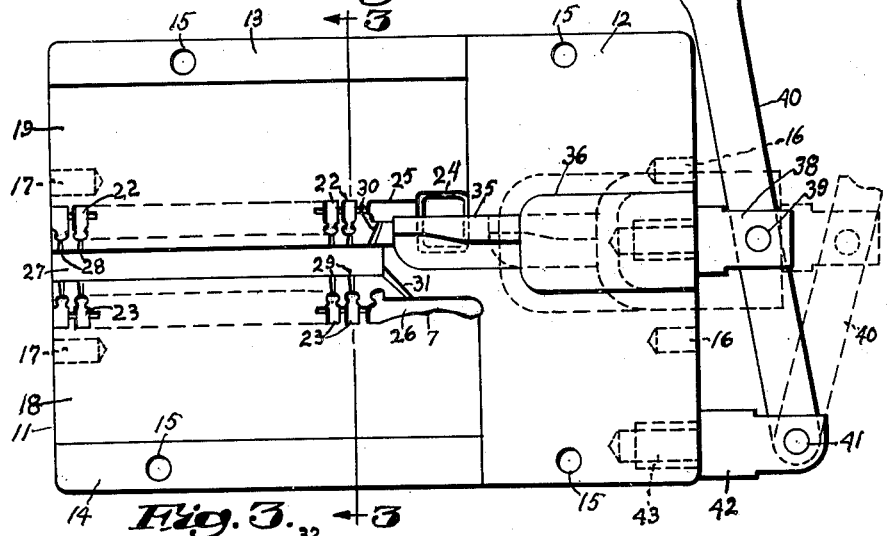
Figure 3:
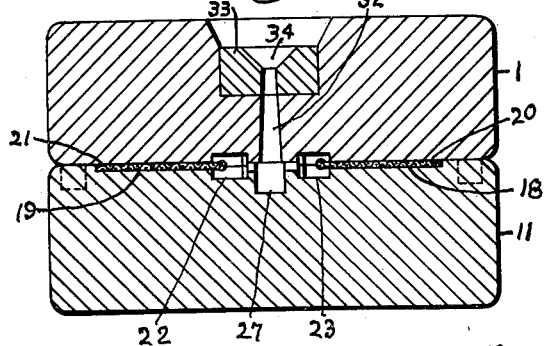
Fig. 3 is a vertical sectional view on line 3—3 Fig. 2 of the lower mould section and showing also in vertical section the upper mould superimposed thereon.

By reason of this construction movement of the lever 40 to full line position illustrated in Fig. 2 would insert the finger core 35 through the retainer and upon movement of the lever 40 to the position illustrated in broken lines in Fig. 2 the core will be fully withdrawn from the retainer cavity.

It is noted that the portion of the core which extends through the retainer cavity has an inclined edge or edges extending longitudinally across the cavity of the retainer and convergingly tapering from the remote end portion of the retainer in proximity to the finger cavity thereof thereby to provide the bottom stop with a downwardly diverging aperture adapted to permit the escape of debris which may accumulate in the retainer for the purpose more fully described in my prior application aforesaid.

Figure 4:
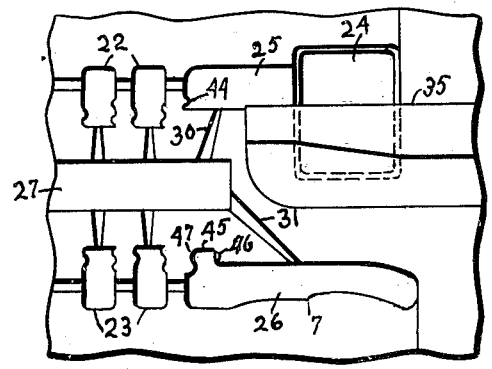
Fig. 4 is an enlarged detail view of the cavities respectively for the retainer and the finger integral therewith and the cavities for the interlocking elements.

In the present construction means are provided for insuring proper interlocking engagement of the finger on the retainer which is secured to one of the stringers and the pin on the other stringer which is inserted into the aperture in the retainer. As illustrated in Fig. 4 the cavity 25 for the retainer finger has at its end an inward projection 44 and the cavity for the pin has an inwardly extending head 45 provided on one side with a cavity 46 providing a projection complementary to the socket 44 produced in the end of the finger. The head 45 is provided at its opposite end with suitable projections and recesses 47 adapted to form recesses and projections complementary to those upon the interlocking elements of the stringers so that when the interengaging elements are moulded upon the respective stringers and the respective stringer pins assembled by the slider in the manner illustrated in Fig. 5 the pin and finger will be securely interlocked and the series of interlocking elements brought into and out of interlocking relation by the movement of the slider.

Figure 5:
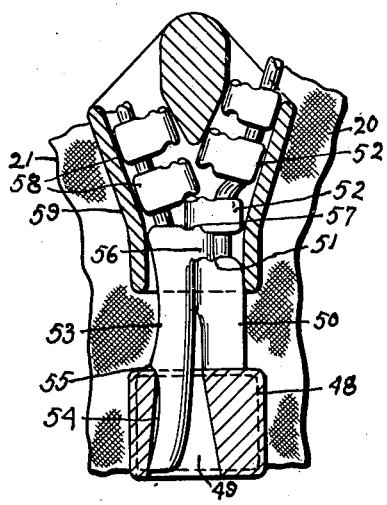
Fig. 5 is a vertical sectional view illustrating the manner in which the finger, pin and interlocking elements are brought to interlocking position by the action of the usual slider.

The lower end portion of the slider fastener in assembled position with the slider mounted thereon is illustrated in Fig. 5 in which the stringer 20 has moulded upon it a retainer 48 having an upwardly converging pin-receiving aperture 49 and an upwardly extending finger 50 provided at its upper end with a recess 51 and with a series of equally spaced interlocking elements 52. The other stringer 21 has moulded upon it a finger 53 of the form illustrated one edge of which is concavely curved with the lower portion 54 extending into the aperture 49 and a shoulder 55 abutting the upper edge of the retainer 48. The lower edge of the head 56 upon the end of the pin 53 overlies the end of the finger 50 and is provided with a projection which seats into the recess 51 of the finger while the upper edge of the head 56 is provided with a projection 57 which engages a complementary recess in the lowermost interlocking element on the stringer 20. The stringer 21 is provided with a series of equally spaced interlocking elements 58 having recesses and projections complementary to those on the stringer 20 and a slider 59 which is mounted upon the interengaging elements thus assembled enables the interlocking elements to be brought into and out of interlocking engagement in the usual manner.

In the operation of the device the upper mould section is superimposed upon the lower mould section with the dowel pins 10 of the upper mould section inserted into the dowel sockets 15 in the lower mould section. The lever 40 is then moved to the position shown in full lines in Fig. 2 thereby inserting the core 35 through the retainer cavity 24. Suitable mouldable, preferably thermoplastic material is then introduced under pressure through the sprue hole 32 into the runner channel 27 and flows therefrom through the respective gates 28, 29, and 30, 31 respectively into the cavities of the interlocking elements and the cavities for the retainer and pin. Inasmuch as the complementary mould cavities in the upper and lower mould sections are symmetrical with respect to the contacting faces of the mould section the shank portions of the interlocking elements and the retainer and pin will be simultaneously cast upon the respective stringers.

By reason of this construction all of the cooperating elements of the respective stringers are simultaneously moulded upon the selvage or beaded edges of the respective stringers thereby enabling the assemblage of the cooperating elements upon the respective stringers to be more economically and rapidly effected.

When the cooperating elements are thus moulded upon the respective stringers and the mould sections separated the stringers and their cooperating elements can be removed from the mould, the material contained in the runner channel and the gates therefrom broken from the respective elements and again melted and any excess material still adhering to the respective elements readily ground and polished off thereby producing completed stringer chains adapted without further operation to be assembled with the usual slider.

By reason of the fact that the respective cooperating elements, including not only the interlocking elements but also the retainer and the pin, are definitely cast upon the stringers in properly spaced relation cooperation of the stringers when brought into interlocking position is asssured.

By reason of the present invention therefore rapid and economical construction of the stringer members of a sliding clasp fastener is attained and accurate cooperation of the elements thereof insured.

It will be understood that the particular embodiment of the invention shown and described herein is of an illustrative character and that various modifications in construction and arrangement of parts may be made within the spirit and scope of the following claims.

Having thus described the invention, what is claimed as new, and desired to be secured by Letters Patent, is:

1. Moulding apparatus for simultaneously moulding upon the respective stringers of a sliding clasp fastener complementary interengaging elements comprising a mould having cooperating mould sections provided with complementary parallel longitudinal grooves to receive the respective stringers, complementary cavities for the interlocking elements enclosing the edge portions of the respective stringers, a runner extending longitudinally of and intermediate of said cavities having gates communicating with the respective cavities, complementary cavities respectively for a pin and for a bottom stop retainer enclosing the edge portions of the respective stringers and communicating with said runner, a removable core member extending longitudinally across the retainer cavity, and means for introducing mouldable material into said runner whereby said mouldable material will be caused to fill all of said cavities.

2. Moulding apparatus for simultaneously moulding upon the respective stringers of a sliding clasp fastener complementary interengaging elements comprising a mould having cooperating mould sections provided with complementary parallel longitudinal grooves to receive the respective stringers, complementary cavities for the interlocking elements enclosing the edge portions of the respective stringers, a runner extending longitudinally of and intermediate of said cavities having gates communicating with the respective cavities, complementary cavities respectively for a pin and for a bottom stop retainer communicating with said runner enclosing the edge portions of the respective stringers, a core member having a converging portion extending longitudinally across the bottom stop retainer cavity, means for inserting and withdrawing the core member from the mould while the mould sections are in closed position, and means for introducing mouldable material into said runner whereby said mouldable material will be caused to fill all of said cavities.

3. Moulding apparatus for simultaneously moulding upon the respective stringers of a sliding clasp fastener complementary interengaging elements comprising a mould having cooperating mould sections provided with complementary parallel longitudinal grooves to receive the respective stringers, complementary cavities for the interlocking elements enclosing the edge portions of the respective stringers, a runner extending longitudinally of and intermediate of said cavities having gates communicating with the respective cavities, complementary cavities respectively for a pin and for a bottom stop retainer communicating with said runner enclosing the edge portions of the respective stringers, a core member having a converging portion extending longitudinally across the bottom stop retainer cavity, a lever fulcrumed on one of said mould sections pivotally connected to said core operable to insert and withdraw the core member from the mould while the mould sections are in closed position, and means for introducing mouldable material into said runner whereby said mouldable material will be caused to fill all of said cavities.

4. Moulding apparatus for simultaneously moulding upon the respective stringers of a sliding clasp fastener complementary interengaging elements comprising a mould having cooperating mould sections provided with complementary parallel longitudinal grooves to receive the respective stringers, complementary cavities for the interlocking elements enclosing the edge portions of the respective stringers, a runner extending longitudinally of and intermediate of said cavities having gates communicating with the respective cavities, complementary cavities in said mould sections enclosing the edges of a stringer and communicating with said runner to form a pin on said stringer and having a laterally extending head portion provided with projections and recesses, complementary cavities for a bottom stop retainer communicating with said runner and having a finger extending therefrom provided with recesses and projections complementary to those of said pin cavity, a removable convergingly tapered core extending longitudinally across the cavity of said retainer in proximity to the finger to provide a pin-receiving aperture, and means for introducing thermoplastic material into said runner.

5. Moulding apparatus for simultaneously moulding upon the respective stringers of a sliding clasp fastener complementary interengaging elements comprising a mould having cooperating mould sections provided with complementary parallel longitudinal grooves to receive the respective stringers, complementary cavities for the interlocking elements enclosing the edge portions of the respective stringers, a runner extending longitudinally of and intermediate of said cavities having gates communicating with the respective cavities, complementary cavities in said mould sections communicating with said runner to form a pin on said stringer having a laterally extending head portion provided with projections and recesses, complementary cavities for a bottom stop retainer communicating with said runner and having a finger extending therefrom provided with recesses and projections complementary to those of said pin cavity, a removable convergingly tapered core extending longitudinally across the cavity of said retainer in proximity to the finger cavity thereof, a sprue hole in one of said mould sections leading to said runner, and branches leading from said runner respectively to said pin cavity and to the finger portion of the bottom stop cavity.

JOHN BOLTEN, Jr.

REFERENCES CITED

The following references are of record in the file of this patent:

UNITED STATES PATENTS

| Number | Name | Date |
| --- | --- | --- |
| 1,022,724 | Custer | Apr. 9, 1912 |
| 2,170,421 | Morin et al. | Aug. 22, 1939 |
| 2,269,881 | Morin | Jan. 13, 1942 |
| 2,341,404 | Winterhalter | Feb. 8, 1944 |